United States Patent [19]

Devine, Jr.

[11] 4,418,859

[45] Dec. 6, 1983

[54] METHOD OF MAKING APPARATUS FOR THE EXCHANGE OF HEAT USING ZIRCONIUM STABILIZED FERRITIC STAINLESS STEELS

[75] Inventor: Thomas M. Devine, Jr., Scotia, N.Y.

[73] Assignee: General Electric Company, Schenectady, N.Y.

[21] Appl. No.: 429,750

[22] Filed: Sep. 30, 1982

Related U.S. Application Data

[63] Continuation of Ser. No. 268,458, May 29, 1981, abandoned.

[51] Int. Cl.³ ..................... B23K 31/06; C22C 38/28
[52] U.S. Cl. ............................... 228/183; 29/157.3 B; 122/DIG. 13; 148/37; 228/263.15
[58] Field of Search ..................... 75/126 F, 126 P; 228/163.15; 148/37; 122/DIG. 13; 29/157.3 B

[56] References Cited

U.S. PATENT DOCUMENTS

| | | | |
|---|---|---|---|
| 3,813,240 | 5/1974 | Abe | 75/126 F |
| 3,926,624 | 12/1975 | Aronson et al. | 75/126 F |
| 4,010,049 | 3/1977 | Rarey | 75/126 F |
| 4,140,526 | 2/1979 | Moroishi et al. | 75/126 F |

FOREIGN PATENT DOCUMENTS

| | | | |
|---|---|---|---|
| 47-16319 | 9/1972 | Japan | 75/126 P |
| 55-24901 | 2/1980 | Japan | 75/126 F |

OTHER PUBLICATIONS

Moroishi et al., "The Effect of Zr on the Oxidation Resistance of Chromium Stainless Steel", Sumitomo Metal Industries Report, May 20, 1978, pp. 1-23.
Metals Abstracts, Nov. 1979, vol. 12, No. 31-2691, p. 52.

*Primary Examiner*—Peter K. Skiff
*Attorney, Agent, or Firm*—Leo I. MaLossi; James C. Davis, Jr.; James Magee, Jr.

[57] ABSTRACT

This invention provides zirconium stabilized corrosion-resistant ferritic stainless steels particularly suitable for long-term use at moderate service temperatures in the as-welded condition or following a high temperature anneal.

3 Claims, 8 Drawing Figures

METHOD OF MAKING APPARATUS FOR THE EXCHANGE OF HEAT USING ZIRCONIUM STABILIZED FERRITIC STAINLESS STEELS

CROSS-REFERENCE TO RELATED PATENT APPLICATION

This application is a continuation of application Ser. No. 268,458, filed May 29, 1981, now abandoned; the entirety of which is incorporated herein by reference.

This invention is related to the invention disclosed and claimed in U.S. patent application Ser. No. 244,379 filed Mar. 16, 1981 now U.S. Pat. No. 4,374,666 (a Continuation-in-Part of Ser. No. 234,213, filed Feb. 13, 1981), which is assigned to the same assignee as the instant application, and is entitled "Stabilized Ferritic Stainless Steel for Preheater and Reheater Equipment Applications"; the entirety of that application is incorporated herein by reference.

U.S. patent application Ser. No. 424,113 filed Sept. 27, 1982, is a division of application Ser. No. 244,379.

BACKGROUND OF THE INVENTION

1. Field of the Invention

This invention relates to stabilized stainless steels in general and particularly to zirconium stabilized ferritic stainless steels suitable for long-term use at moderate service temperatures in the as-welded condition or following a high temperature anneal.

2. Description of the Prior Art

In the metallurgical arts, stainless steels are those alloys of iron which contain sufficient amounts of alloying elements, particularly chromium, to impart corrosion and scale resistance. It is known in the art that at least about 12 weight percent chromium is required to impart the levels of corrosion and scale resistance commonly attributed to stainless steels in aqueous media. The corrosion and scale resistance imparted by chromium is derived from its ability to form a protective, or passivating, film.

Under certain circumstances, however, it is possible to lose the beneficial effects of chromium through a phenomenon frequently referred to as sensitization. A sensitized stainless steel is one which is susceptible to intergranular corrosion (IGC) or intergranular stress corrosion cracking (IGSCC) as a result of the formation of chromium-rich precipitates, usually carbides, at the grain boundaries. With the formation of the precipitates there is a concomitant depletion of chromium below the level required for corrosion resistance in areas adjacent to the grain boundary. This description of the mechanism by which stainless steels are sensitized is referred to in the art as the grain boundary chromium depletion model. Sensitization has been most extensively studied and the bulk of the prior art literature relates to the austenitic class of stainless steels.

Susceptibility to sensitization is a function of the chemistry of the alloy; the prior physical condition including, for example, the extent of any cold deformation; and the nature of sites available for the precipitation of chromium-rich carbides. Sensitization is also a kinetic phenomenon. Therefore, sensitization is also a function of the techniques used in its assessment and can be influenced by the thermo-mechanical history developed during processing and fabrication. For example, an austenitic stainless steel heated to an elevated temperature, as during a welding operation, and cooled slowly may exhibit sensitization whereas the same stainless steel heated in the same manner but cooled very rapidly may not.

One technique for preventing sensitization is to reduce the carbon content to extremely low levels (typically less than about 0.030%). Low carbon levels minimize the amount of carbon available for carbide formation and, therefore, the extent of formation of chromium-rich carbides. For some applications, however, such as where high strength is required, a decreased carbon content is not desirable.

Another means for avoiding sensitization is to add other alloying elements, known as stabilizers, such as niobium and titanium, which have stronger carbide-forming tendencies than chromium. These elements rather than the chromium form carbides thus permitting the matrix to retain the corrosion-inhibiting chromium. However, the use of niobium or titanium has been shown not to be a panacea as it is possible to sensitize these so-called stabilized austenitic stainless steels through improper heat treatments or fabrication techniques. Also, excessive amounts of these elements may embrittle the stainless steel.

The phenomenon of sensitization of ferritic stainless steels was first reported in 1933 by Houdremont and Shafmeister (Archiv. fur das Eisenhüttenwessen, 7, p. 187, 1933). Since that time, relatively few investigations have been conducted on the sensitization of ferritic stainless steels compared to the vast number of papers published on the sensitization of austenitic stainless steels. The apparent lack of interest in the sensitization behavior of ferritic stainless steels in the past was chiefly due to their low toughness and, therefore, limited usefulness as materials of construction. Then, in 1950, Binder and Spendelow reported in the Transactions of the ASTM (43, p. 759, 1950) that the toughness of ferritic stainless steels could be greatly improved by the reduction of the interstitials carbon and nitrogen. The advent of special melting practices, e.g., argon-oxygen decarburization (AOD), vacuum-oxygen decarburization (VOD), and electron beam melting, made available low interstitial ferritic stainless steels of excellent toughness. The application of ferritic stainless steels to structural components was, therefore, no longer necessarily precluded by low toughness and in many applications the use of ferritic stainless steels is now largely regulated by corrosion resistance. Consequently, an understanding of the mechanisms of sensitization of ferritic stainless steels, particularly the stabilized ferritic stainless steels, became of importance.

The earlier work was conducted on unstabilized ferritic stainless steels and employed the techniques pioneered during studies of the austenitic stainless steels. The prior art investigators have generally concluded that the grain boundary chromium depletion model adequately explains the sensitization of unstabilized ferritic stainless steels, as it did for the austenitic stainless steels, although the kinetics for the two types of steel are generally different.

If grain boundary chromium depletion is responsible for the sensitization of ferritic stainless steels, then, as in the case of austenitic stainless steels, the addition of titanium and niobium should inhibit sensitization. That general premise is true, however, there exist differences of opinion among the experts relative to the amount of titanium required for the stabilization of ferritic stainless steels. Further, there are some references extant in the literature which stand for the proposition that excessive additions of stabilizers, particularly titanium, inherently result in mechanical embrittlement particularly when thick, i.e., greater than about 0.254 cm (0.100 in), sections are involved. Work in this area is sparse and, on the one hand, tends to be limited to specific alloys, and as the work of Demo (Met. Trans., 5, 2253, 1974), not readily transferable to alloys of other compositions. On the other hand, the work of Abo et al. ("Stainless Steels '77", Climax Molybdenum Company, 1977) stands for the broad premise that titanium additions should be as low as possible since even small amounts of titanium raise the ductile-to-brittle transition temperature and further additions raise that transition temperature even further to an asymptotic maximum.

Several prior art teachings relative to the amount of titanium required to stabilize ferritic stainless steels are presented in Table I, below. These prior art teachings are generally presented as formulas or graphs which are said to be capable of predicting the amount of titanium required to stabilize ferritic stainless steels if their carbon and nitrogen contents are known. It should be noted that the prior art investigations and criteria derived therefrom of Table I are based on sensitizing treatments which employed welding operations or high temperature heat treatment without subsequent aging to simulate long term service exposure.

As materials of construction, the ferritic stainless steels are prime candidates for many original applications in industry, in both welded and unwelded configurations, and as replacements for conventional materials to improve service lifetime expectancies. A typical application is as welded tubing in heat exchangers, such as moisture separator reheaters (MSR) and feedwater preheaters (FWP), frequently found in the steam supply systems of fossile-fired and nuclear fueled commercial electrical power generating stations.

Moisture separator reheaters, for example, are located between the high pressure turbine and the low pressure turbine of most nuclear steam generating units. As its name suggests, an MSR accepts the exhaust steam from the high pressure turbine, separates out the moisture, reheats the steam and directs it toward the low pressure turbine. The moisture separation is achieved by passing the steam over a set of chevron plates onto which the condensate collects. The steam reheat is typically accomplished by passing a first medium, i.e., high temperature pressurized steam, through enclosing members such as thin-walled tubes. These tubes are generally arranged in closely spaced arrays and frequently are finned on the outside to facilitate heat transfer. The second medium, i.e., the exhaust steam to be heated, is passed through gaps in the array. Heat passes through the tube walls from the high temperature steam to the low temperature steam. The service conditions thus encompass exposure to temperatures on the order of about 300° C. and chloride and hydroxide ions, from impurities in the water, which are capable of causing stress corrosion cracking. Welding is extensively used in the manufacture of the tubes. The tubes are frequently formed from strip material formed into tubes, seam welded longitudinally, and finned; adjacent sections of the tubes are butt welded, and the tubes are terminated by welding into tube sheets.

Copper-containing low-alloy steel is one material presently employed as an MSR tubing material. Unfortunately, because of its low corrosion resistance a rust-film can form on the surface of the finned low-alloy steel tubes. This rust film can bridge the gap between adjacent fins (a phenomenon referred to as "rust bridging") thereby reducing the heat transfer between the steam flowing inside and outside of the tube.

BRIEF DESCRIPTION OF THE INVENTION

Ferritic stainless steels are prime candidates for many original applications in industry, in both welded and unwelded configurations, and as replacements for presently used materials to improve service lifetime expectancies. A typical application is as welded tubing in heat exchangers, such as moisture separator reheaters and feedwater preheaters, frequently found in the steam supply systems of fossil-fired and nuclear fueled commercial electrical power generating stations.

Susceptibility to sensitization was unexpectedly discovered during the evaluation of two grades of titanium-stabilized ferritic stainless steel for use as tubing in heat exchangers. The susceptibility to sensitization was predicted to occur under conditions of long-time (about 40 years) exposure at intermediate temperatures (about 300° C.) following a simulated welding operation.

TABLE I

Prior Art Stabilization Criteria for Ferritic Stainless Steels

| Authors | Stabilization Criterion (wt. %) | Alloy/Sensitizing Treatment/Test of Sensitization | Wt. % Titanium Required to Stabilize HEAT A | Wt. % Titanium Required to Stabilize HEAT B |
|---|---|---|---|---|
| Bond & Lizlovs[1] | Ti ≧ 6 (C + N) or Ti > 14C | 18Cr—2Mo/926° C.–1149° C./1hr.W.Q. also TIG weld/A262E | ≧0.16 or >0.32 | ≧0.23 or >0.32 |
| Bond & Dundas[2] | Ti ≧ 0.15 + 3.7 (C + N) | 18Cr—2Mo/Not Reported/Not Reported | 0.25 | 0.29 |
| Lula, Lena and Kiefer[3] | Ti > 8~9 C | 16–28% Cr/Heliarc Weld/Krupp[6] | 0.184 | 0.184 |
| Troselius et al[4] | Ti ≧ 10 (C + N) | 18Cr—2Mo/TIG welded/A262E | 0.26 | 0.38 |
| Demo[5] | Graphical, f(Cr, C + N, Al) e.g. Ti > 1.1% for C + N = 500 ppm | 19% Cr/weld/A262D[7] | Not calculable | Not calculable |

[1]A. P. Bond and E. A. Lizlovs, J. Electrochem. Soc., 116, p. 1305 (1969)
[2]As cited by R. F. Steigerwald, H. J. Dundas, J. D. Redmond, and R. M. Davison, "The Physical Metallurgy of Fe—Cr—Mo Ferritic Stainless Steels" in Stainless Steel '77, Climax Molybdenum Company, 1977
[3]R. A. Lula, A. J. Lena, G. C. Kiefer, Trans. ASM, 46, p. 197 (1954)
[4]L. Troselius, I. Andersson, S. O. Bernhardsson, J. Degerbeck, J. Henrickson, A. Karlsson, Br. Corros. J., 10, p. 674 (1975)
[5]J. J. Demo, Met. Trans., 5, p. 2253 (1974)
[6]boiling 10% $H_2SO_4$ + 10% $CuSO_4$ for 48 hr. immersion period
[7]boiling 50% $H_2SO_4$ + 41.6 g/l $Fe_2(SO_4)_3$ New zirconium stabilized ferritic stainless steels were, therefore, invented in response to the discovered susceptibility to sensitization of the prior art steels. An 18% chromium-2% molybdenum version consists essentially of, in weight percent, 0.025% max carbon, 0.025% max nitrogen, 1.0% max silicon, 1.0% max manganese, 0.04% max phosphorous, 0.03% max sulfur, 18 to 20% chromium, 1.75 to 2.25% molybdenum, and 0.015 to 2.0% zirconium; the sum of carbon plus nitrogen is 0.045% max, and the balance is iron plus impurities. A 12% chromium version consists essentially of, in weight percent, 0.025% max carbon, 0.025% max nitrogen, 1.0% max silicon, 1.0% max manganese, 0.04% max phosphorous, 0.03% max sulfur, 11 to 30% chromium, and 0.015 to 2.0% zirconium; the sum of carbon plus nitrogen is 0.045% max, and the balance is iron plus impurities.

DETAILED DESCRIPTION OF THE INVENTION

Figure 1:
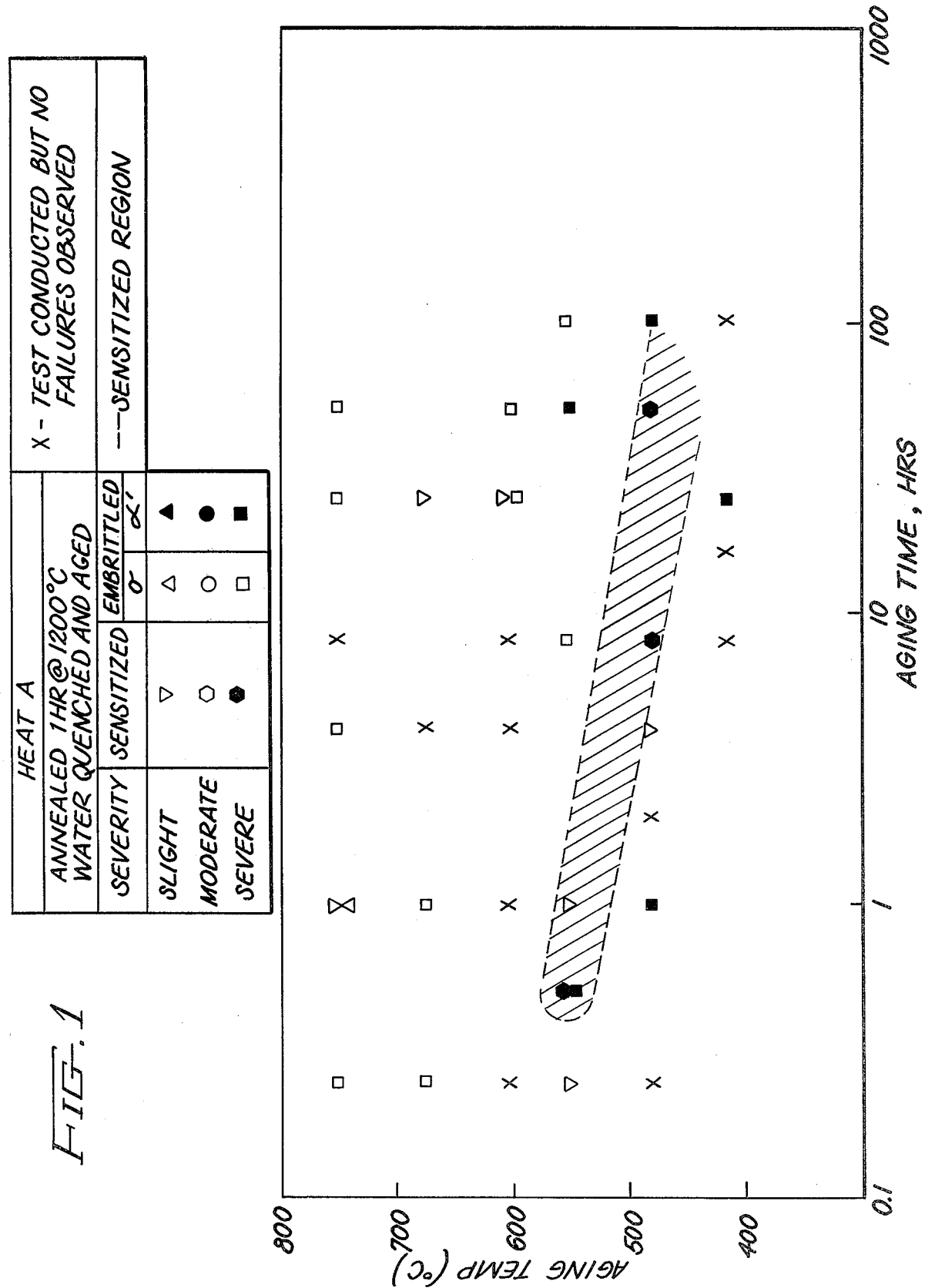
FIG. 1 is a semilogarithmic graph of the results of ASTM A262E tests conducted on heat A as functions of aging time and aging temperature following water quenching after an anneal for 1 hour at 1200° C.

Ferritic stainless steels were selected for evaluation as alternate materials for use as tubes in heat exchangers. A commercially produced stabilized ferritic stainless steel having a nominal composition of 18Cr-2Mo-0.6Ti was selected for initial study. Its composition is listed in Table II, below, and is identified as heat A.

The potential for sensitization to occur in heat A was checked against the criteria of the first four prior art teachings in Table I (the graphical method of Demo was unuseable). The results are presented in Table I (column HEAT A). The results indicate that a minimum titanium content ranging from 0.16 to 0.26% is required to stabilize heat A. Since the titanium content of heat A (0.61 wt. percent) was greater than the minimum range, it was concluded that heat A should be immune to sensitization.

Specimens measuring 1.27 cm (0.5 in) square by 0.19 cm (0.75 in) in thickness were cut from cold rolled sheet stock of heat A and were encapsulated in quartz tubes measuring approximately 1.9 cm (0.75 in) in diameter.

TABLE II

Compositions[1] of 18Cr—2Mo, 18Cr, and 12Cr Titanium-Stabilized Ferritic Stainless Steels (wt. %)

| HEAT | C | Si | Mn | P | S | Cr | Mo | Ti | N | Bal[2] | Ti/C | Ti/N | Ti/(C + N) | Sensitization Resistance Evaluation |
|---|---|---|---|---|---|---|---|---|---|---|---|---|---|---|
| A(45079) | 0.023 | 0.16 | 0.33 | 0.019 | 0.012 | 17.15 | 2.23 | 0.61 | 0.003 | Fe | 26.5 | 203.3 | 23.5 | FAIL |
| B(44062) | 0.023 | 0.46 | 0.44 | 0.024 | 0.005 | 17.40 | 2.25 | 0.32 | 0.015 | Fe | 13.9 | 21.3 | 8.4 | FAIL |
| AA(561) | 0.009 | 1.0 | 1.0 | 0.04 | 0.03 | 12.77 | — | 0.16 | 0.002 | Fe | 17.8 | 80.0 | 14.5 | FAIL |
| BB(541) | 0.034 | 1.0 | 1.0 | 0.04 | 0.03 | 12.00 | — | 0.40 | 0.013 | Fe | 11.7 | 30.8 | 8.5 | FAIL |
| CC(773) | 0.004 | 1.0 | 1.0 | 0.04 | 0.03 | 18.0 | — | 1.00 | 0.004 | Fe | 250 | 250 | 125 | PASS |
| DD(785) | 0.011 | ↓ | ↓ | ↓ | ↓ | 18.0 | — | 0.71 | 0.006 | ↓ | 64.5 | 118.3 | 41.8 | PASS |
| EE(766) | 0.003 | ↓ | ↓ | ↓ | ↓ | 18.52 | — | 0.23 | 0.003 | ↓ | 76.7 | 76.7 | 38.3 | FAIL |
| FF(775) | 0.020 | ↓ | ↓ | ↓ | ↓ | 16.34 | — | 1.04 | 0.015 | ↓ | 52.0 | 69.3 | 29.7 | FAIL |
| GG(765) | 0.009 | ↓ | ↓ | ↓ | ↓ | 17.92 | — | 0.24 | 0.015 | ↓ | 26.7 | 16.0 | 10.0 | FAIL |
| HH(751) | 0.020 | ↓ | ↓ | ↓ | ↓ | 18.52 | — | 0.48 | 0.016 | ↓ | 24.0 | 30.0 | 13.3 | FAIL |
| II(662) | 0.036 | ↓ | ↓ | ↓ | ↓ | 18.0 | — | 0.40 | 0.028 | ↓ | 11.1 | 14.3 | 6.3 | FAIL |

[1] By analysis, except: Si, Mn, P and S max. per specification for heats AA and BB and CC-II; Cr and Ti target per specification for heat CC; and Cr target per specification for heat II.
[2] Plus incidental impurities.

Prior to encapsulation, the quartz tubes were evacuated and back-filled with 1/6 atmosphere of argon. Groups of specimens were annealed for 1 hour at 800°, 900°, 1000°, 1100°, or 1200° C. and rapidly cooled by removing the quartz tubes from the furnace and breaking open under water. The 1200° C. anneal conservatively similates a welding operation and the 800° C. anneal represents a typical process anneal. For the purposes of this invention, the term high temperature anneal refers to any thermal treatment conducted for about 1 hour or more at a temperature of about 800° C. or higher.

The annealed and quenched specimens were subdivided into smaller groups and for each annealing temperature subgroups were aged at temperatures of 415°, 480°, 550°, 600°, 675°, or 750° C. for times of ¼, ½, 1, 2, 4, 8, 16, 24, 48 or 96 hours. Almost all combinations of aging temperatures and times were investigated for specimens annealed at 1200° and 800° C., however, fewer combinations of aging temperatures and times were investigated for specimens quenched from 1100°, 1000° and 900° C. For each combination of aging temperature and time, four specimens were aged to provide a measure of reliability. The samples were prepared for aging by wrapping in zirconium foil to minimize oxygen contamination and encapsulated in evacuated quartz tubes.

After aging, the samples were quenched by breaking the quartz tubes under water, vapor blasted to remove the oxide scale, electropolished for 5 minutes at approximately 2 amps/cm.[2] in a solution of 60%$H_3PO_4$+40% $H_2SO_4$ at 40°-60° C. (104°-140° F.), ultrasonically cleaned in detergent solution, and rinsed in distilled water. Accelerated intergranular corrosion tests were performed according to American Society for Testing and Materials (ASTM) specification A262E (Modified Strauss). Ductility was assessed by the simple bend test which is a part of the A262E procedure.

Specimens annealed at 800°, 900°, 1000°, 1100° and 1200° C. for 1 hour and quenched, but not aged, were not susceptible to intergranular corrosion, i.e., sensitization. This behavior was as predicted by the prior art teachings of Table I. It should be noted that at this stage of the heat treatment the specimens had been processed in a manner similar to the processing employed in the prior art investigations reported in Table I. Embrittlement, however, was detected by the bend tests in some of these annealed and quenched samples. Three factors were found to contribute to the embrittlement. Large grain size alone, such as was found in the samples annealed at the higher temperatures, e.g., 1200° C., was sufficient to cause embrittlement. The embrittlement due to large grain size was exacerbated by the presence of $\sigma$ or $\alpha'$ phases formed during the aging treatments. The presence of $\sigma$ and $\alpha'$ phases in these specimens was determined by transmission electron microscopy and electron diffraction.

In the description of this invention, sensitization refers to intergranular corrosion (IGC), and, by logical extension, to intergranular stress corrosion cracking (IGSCC), as measured by Modified Strauss tests of the ASTM A262E type. The so-called failure mode of such sensitized stainless steels were principally intergranular. Slight cracking due to sensitization refers to the situation where the specimen exhibited at its surface isolated, i.e., non-linked, grain boundary cracks traversing one or two grains and not penetrating more than about $2\mu$ below the surface. Where the cracking due to sensitization is characterized as moderate, the specimen typically exhibited extensive surface cracks, i.e., cracking of about 90% of the grain boundaries, but the cracks penetrated less than about two grain diameters below the surface. The threshold for severe cracking due to sensitization was the ability to observe cracking with the unaided eye as opposed to slight and moderate sensitization which required optical magnification for observation. If no cracks were observed by light microscopy at 400×, the specimens were considered to be free of sensitization. This last criterion is somewhat more conservative than that of ASTM A262E which specifies 250× magnification rather than 400×. A heat was considered to fail the sensitization test if severe cracking due to sensitization was observed following more than one aging treatment.

Embrittlement refers to mechanical cracking as measured by a simple bend test on thin coupons which is an inherent part of the ASTM A262E test. The so-called failure mode of such embrittled stainless steels was principally transgranular cleavage. Slight embrittlement refers to several isolated cracks orginating at the surface and extending one to two grain diameters into the specimen. Upon conditions of moderate embrittlement, the specimen generally contained one large crack transverse to the width of the sample at the point of maximum bend radius and penetrating to a depth of one or two grain diameters. Severely embrittled specimens exhibited extensive macrocracking and fractured with little or no ductility in the bend test.

Ductile grain boundary cracking occurred when isolated sigma phase particles present on the grain boundaries fractured in a brittle manner and initiated ductile tearing of the ligaments between the precipitates. When observed, these cracks were prevalent in the stressed region of the bend specimen and were within about $5\mu$ of the surface.

FIG. 1 shows in graphical form the data for specimens from heat A annealed for 1 hour at 1200° C. and water quenched prior to aging for the times and temperatures noted by the data symbols on FIG. 1. Embrittlement due to $\sigma$ phase, embrittlemenet due to $\alpha'$ phase and a region of sensitization are shown on FIG. 1. Embrittlement by $\sigma$ phase resulting from the high temperature aging treatments (about 600° C. to 800° C.) was expected due to the relatively high chromium content (18%) in the presence of molybdenum. Also expected, due to the relatively high chromium content, was the embrittlement from $\alpha'$ resulting from the low temperature aging treatments (about 400° C. to 600° C.).

That any sensitization occurred in this ferritic stainless steel was completely unexpected based on the prior art teachings and predictions based on Table I; thus the large extent of the temperature-time region, shown in FIG. 1, over which sensitization occurred was also surprising.

Figure 2:
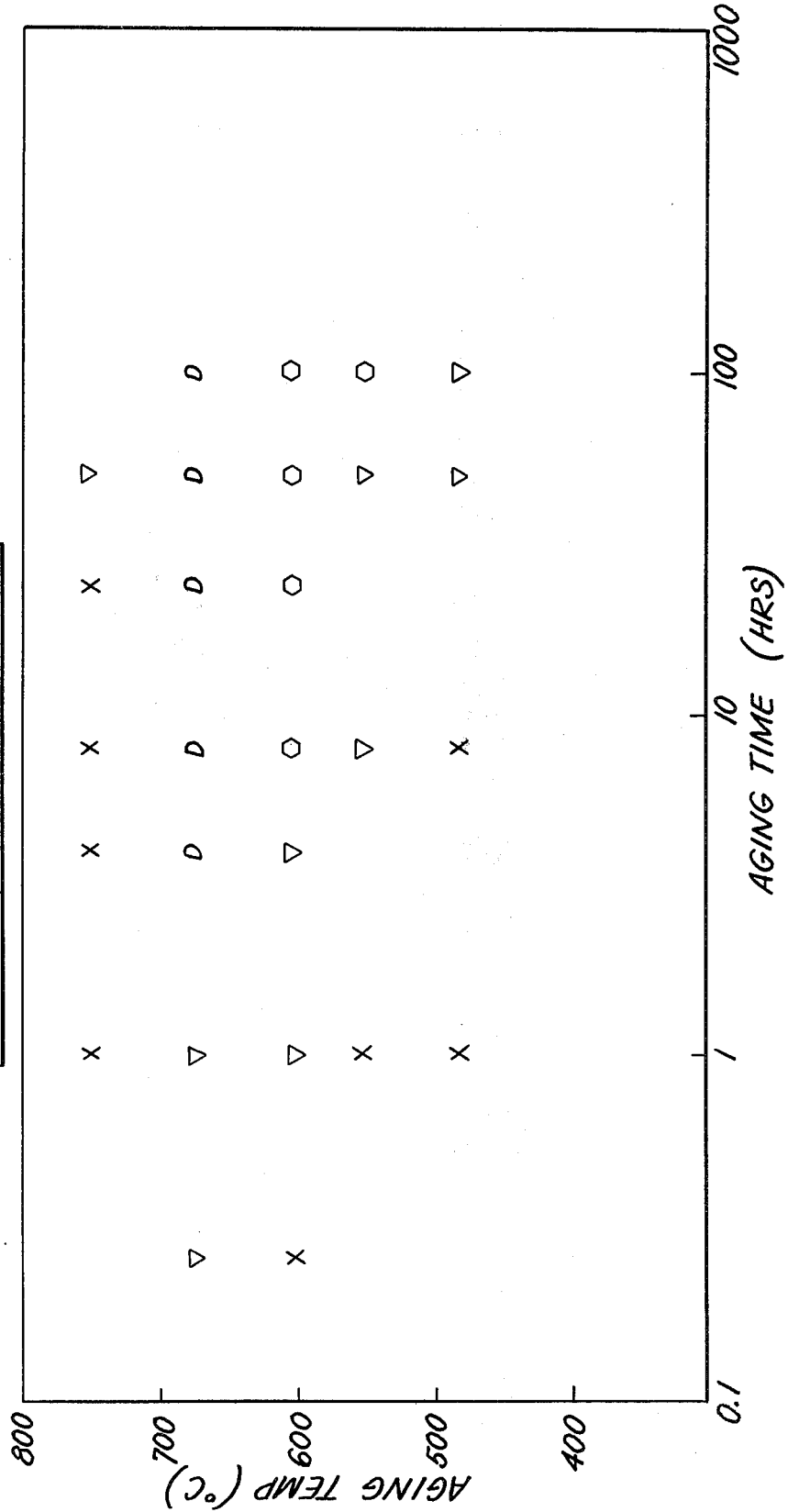
FIG. 2 is a semilogarithmic graph of the results of ASTM A262E tests conducted on heat A as functions of aging time and aging temperature following water quenching after an anneal for 1 hour at 800° C.

FIG. 2 shows in graphical form the data for specimens from heat A annealed at 800° C. for 1 hour, water quenched, and aged for the time and temperatures noted by the data symbols in FIG. 2. By the evaluation criteria set forth above, heat A was considered to be immune to sensitization at all combinations of aging time and temperature shown on FIG. 2 following a 1 hour anneal at 800° C. and water quenching. Although based on a less extensive series of aging treatments, heat A exhibited no sensitization following water quenching after a 1 hour anneal at 900° C., but did exhibit susceptibility to sensitization after annealing at 1000° and 1100° C. Embrittlement was found in heat A only in those specimens annealed for 1 hour at 1200° C.

Additional ASTM A262E tests were performed in accordance with the method discussed above on a second heat of commercially available 18%Cr-2%Mo stainless steel. This second heat is identified as heat B in Table II. Heat B, with a titanium content of 0.32 wt. percent, was predicted to be insensitive to sensitization by two of the formulas of Table I (Bond & Lizlovs and Lula et al.) and borderline by a third (Bond & Dundas). Again, the formula of Demo was not useable.

Figure 3:
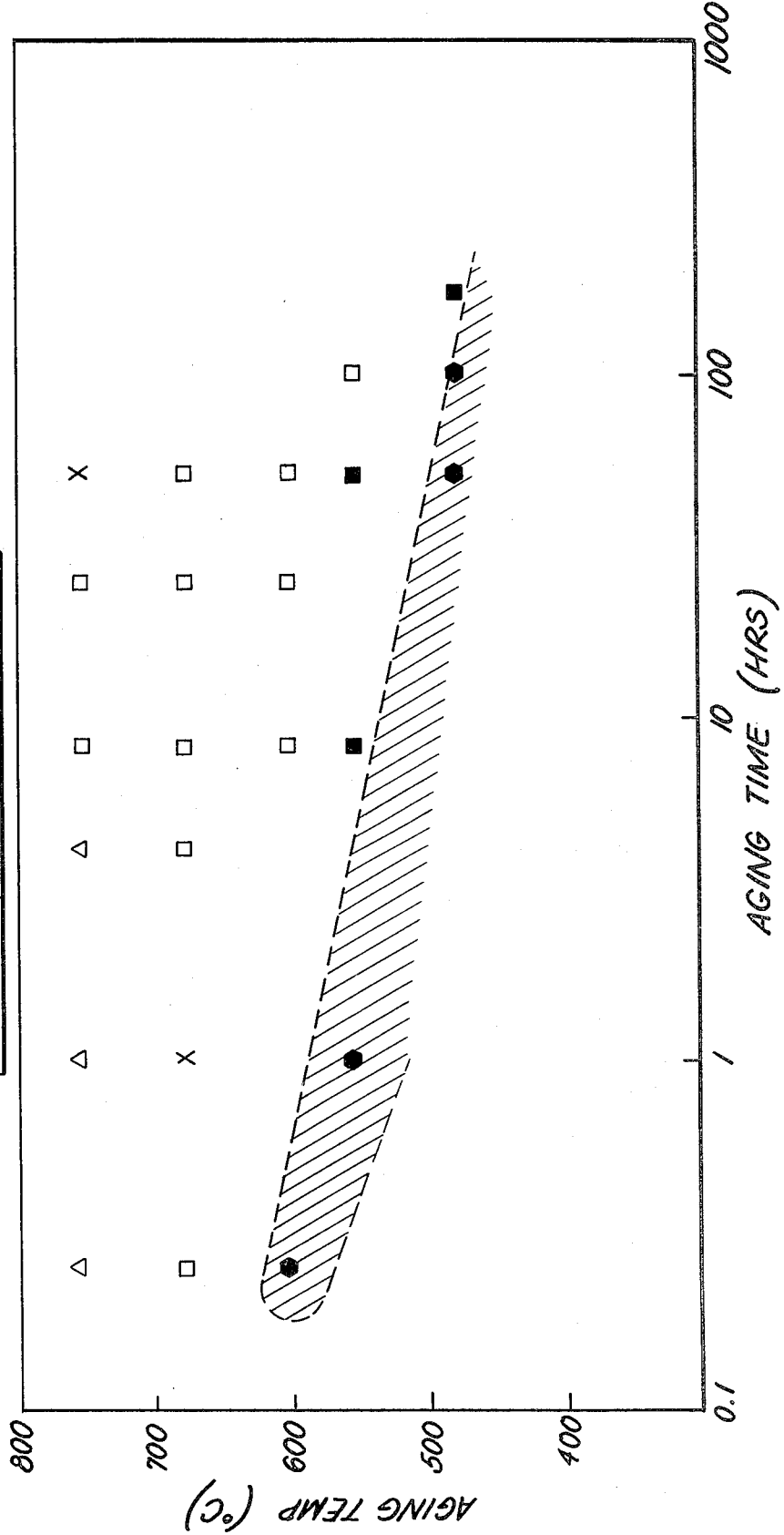
FIG. 3 is a semilogarithmic graph of the results of ASTM A262E tests conducted on heat B as functions of aging time and aging temperature following water quenching after an anneal for 1 hour at 1200° C.

The tests on heat B focused on the behavior in the ASTM A262E test resulting from various aging treatments following water quenching after a 1 hour anneal at 1200° C. The results of tests on heat B specimens annealed at 1200° C. are summarized in FIG. 3. It should be noted that the embrittlement by $\sigma$ phase, embrittlement by $\alpha'$ phase and the unexpected sensitization of heat B was similar in extent and severity to that of heat A.

Figure 4:
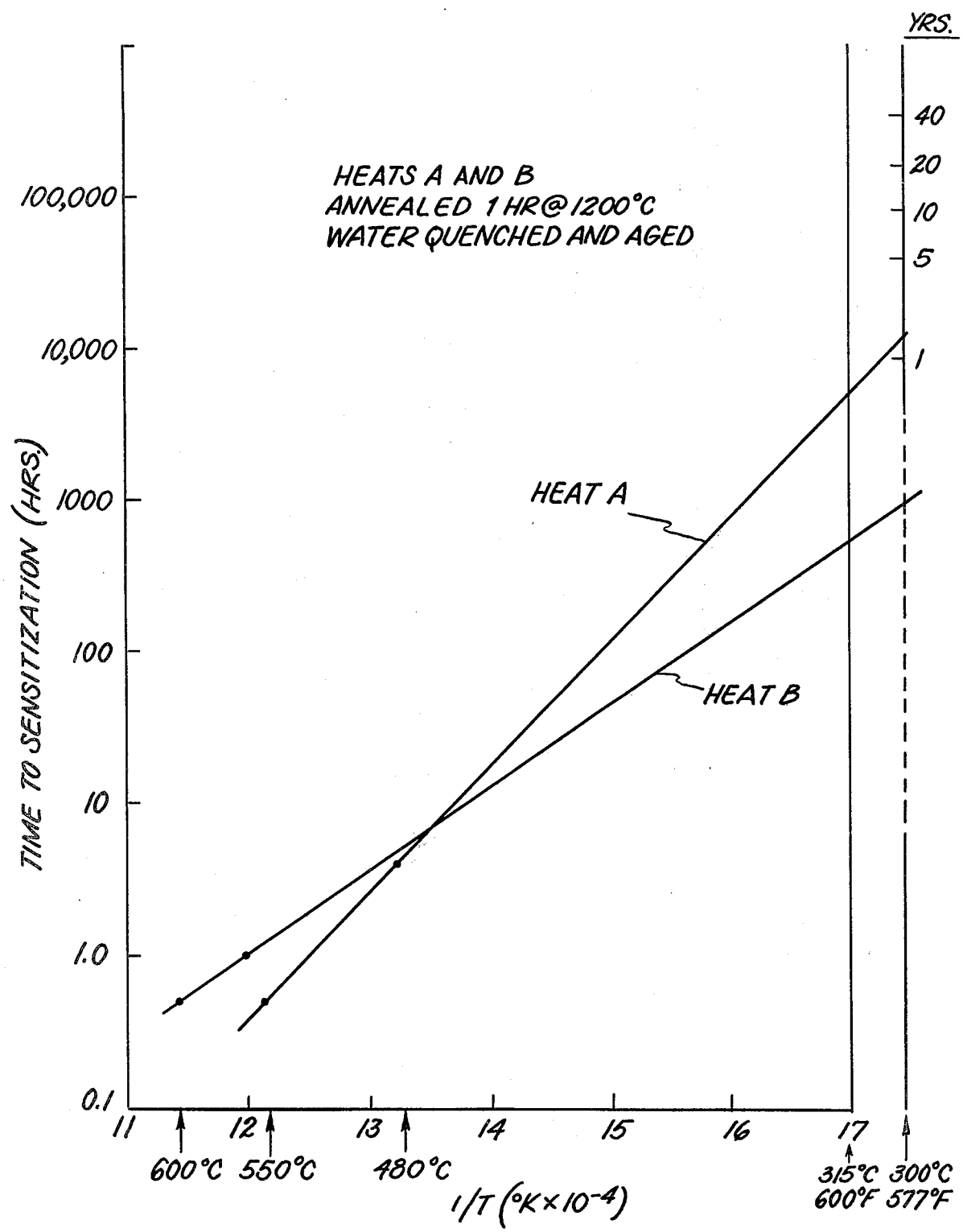
FIG. 4 is a semilogarithmic graph of the minimum observed time for sensitization to occur versus inverse absolute temperature whereon the time for sensitization to occur in heats A and B is extrapolated to the typical service temperature of moisture separator reheaters and feedwater preheaters.

The time to failure by sensitization, i.e., intergranular corrosion, of heats A and B was extrapolated to the service temperature of moisture separator reheaters and feedwater preheaters (about 300° C.) using the shortest observed time to failure at each aging temperature. This extrapolation is shown in FIG. 4 wherein the time to failure is plotted semilogarithmically versus inverse temperature. Heat A by these tests was predicted to fail in a little over 1 year and heat B in about a month. These predicted minimum times to failure were considerably less than the service life (about 40 years) anticipated for heat exchanger equipment having ferritic stainless steel tubes even with a reasonable allowance for statistical variations attendant this type of extrapolation to long times.

Two experimental heats, designated as AA and BB in Table II were melted and evaluated. In those heats, the chromium content was reduced to nearly the minimum required for corrosion resistance (i.e., 12%), molybdenum was excluded to minimize the possibility of embrittlement due to σ phase, and titanium was added in excess of the teachings of Table I.

Using the same general method discussed above, the susceptibility of these 12%Cr heats (AA and BB) to sensitization and embrittlement, as measured by the ASTM A262E test, was evaluated. The only significant change from the general evaluation method discussed above for these experimental 12%Cr stainless steels, and those discussed below, was that the concentration of the $H_2SO_4$ solution used in the ASTM A262E test was about 0.5 weight percent instead of about 16 weight percent. Use of a 0.5 weight percent $H_2SO_4$ solution was determined to be sufficient to detect sensitization, yet below the concentration which would cause rapid general corrosion of unsensitized 12%Cr stainless steels.

Figure 5:
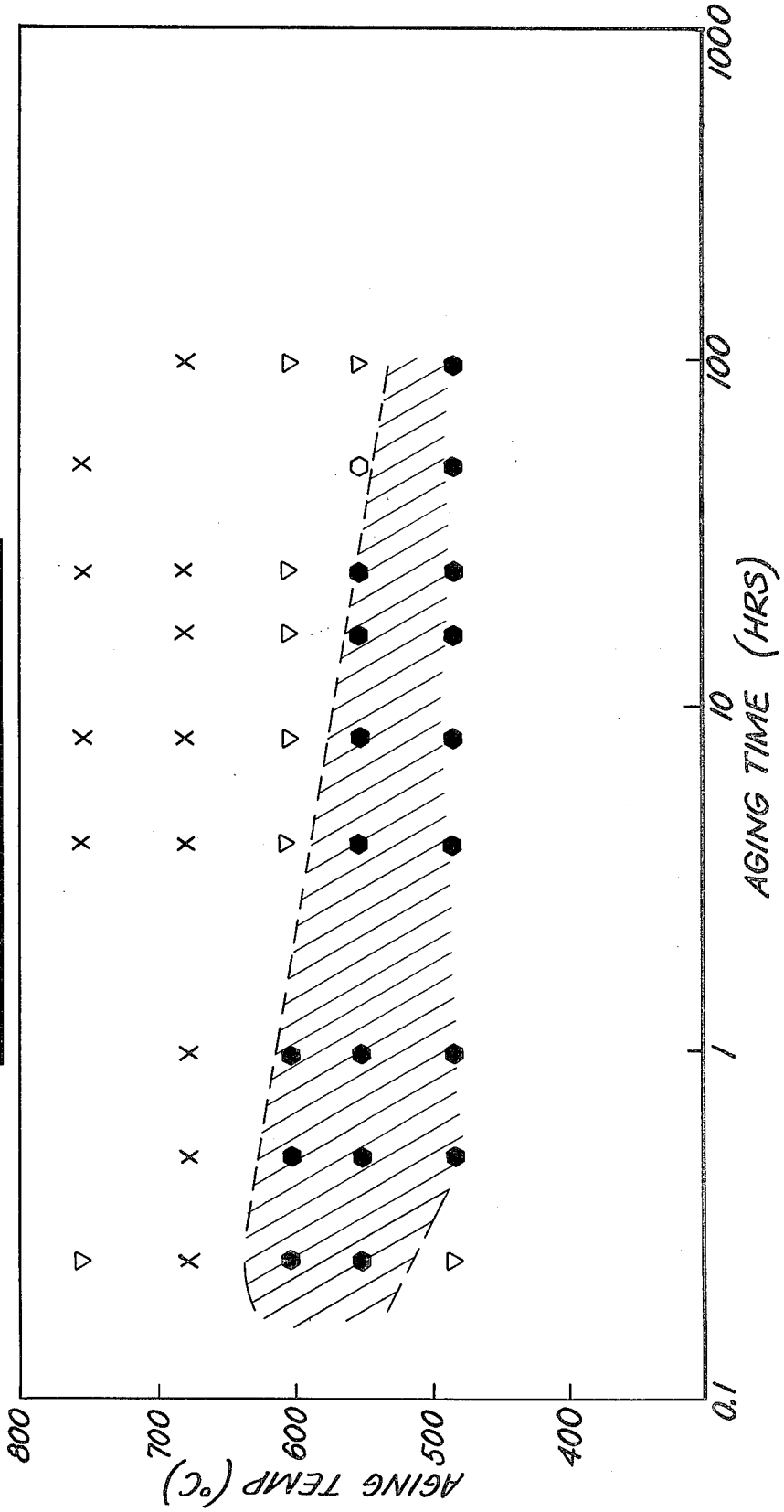
FIG. 5 is a semilogarithmic graph of the results of ASTM A262E tests conducted on heat AA as functions of aging time and aging temperature following quenching after an anneal for 1 hour at 1200° C.

Specimens from heats AA and BB annealed at 1200° C. for 1 hour, water quenched, and aged did not embrittle. However, again and surprisingly, sensitization of about the same magnitude and extent as exhibited previously by specimens from heats A and B, occurred in these 12%Cr heats. The data from the tests on heat AA following the 1 hour anneal at 1200° C., which are representative of the data from heat BB under the same conditions, are shown graphically on FIG. 5. Specimens from heats AA and BB water quenched after a 1 hour anneal at 800° C. did not exhibit sensitization or embrittlement irrespective of aging time or temperature.

Figure 6:
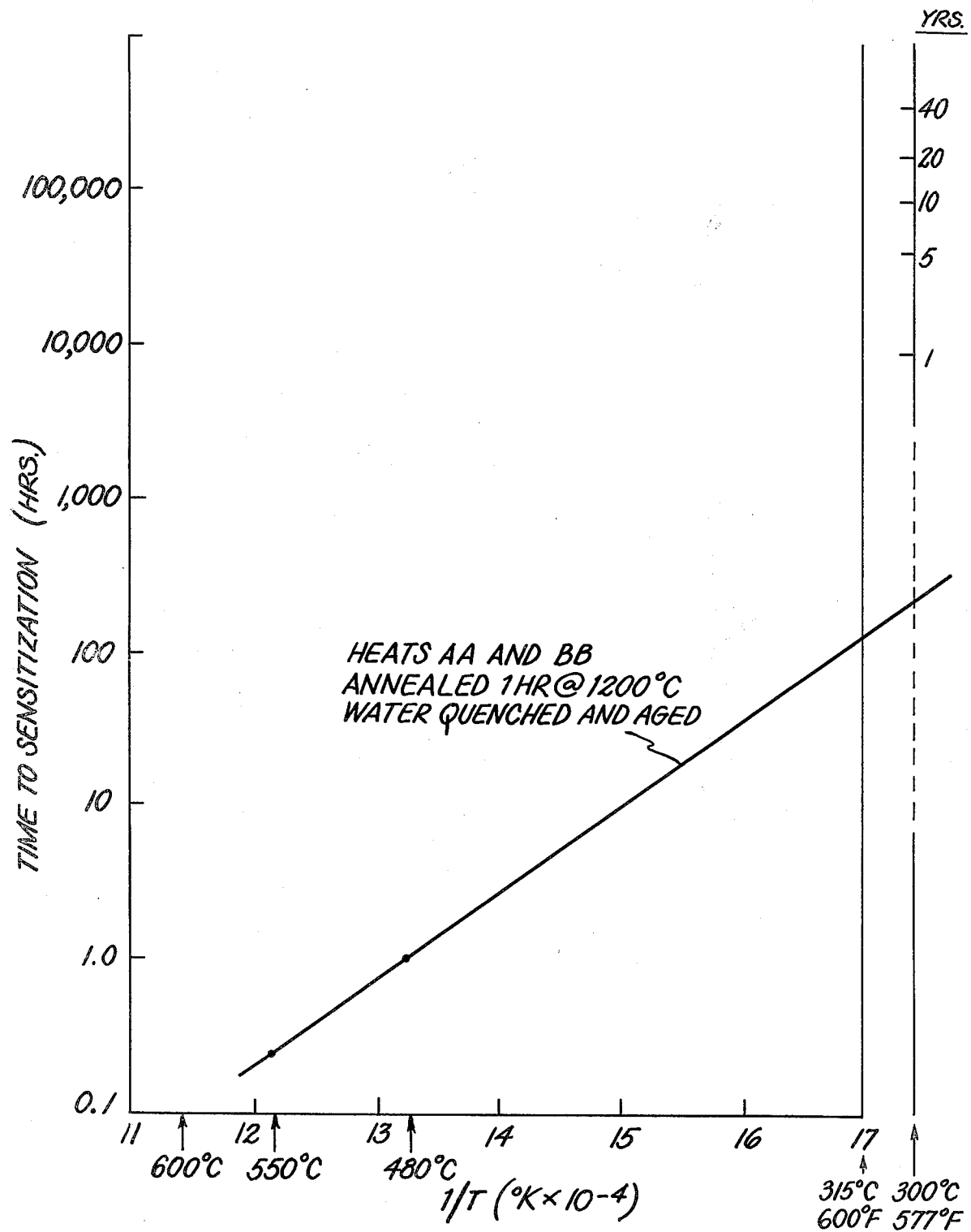
FIG. 6 is a semilogarithmic graph of the minimum observed time for sensitization to occur versus inverse absolute temperature whereon the time for sensitization to occur in heats AA and BB is extrapolated to the typical service temperature of moisture separator reheaters and feedwater preheaters.

The time to failure by sensitization, i.e., intergranular corrosion, of heats AA and BB was extrapolated to the service temperature of moisture separator reheaters and feedwater preheaters (about 300° C.) using the shortest observed time to failure at each aging temperature. This extrapolation is shown in FIG. 6 wherein the time to failure is plotted semilogarithmically versus inverse temperature. As was the case for 18%Cr-2%Mo heats A and B, discussed above, the extrapolated minimum time to failure was considerably less than the service life (about 40 years) anticipated for heat exchanger equipment having ferritic stainless steel tubes even with a reasonable allowance for statistical variation attendant this type of extrapolation to long times.

Heats of 12%Cr ferritic stainless steel having tantalum (not listed), tantalum plus aluminum (not listed), and zirconium as the candidate stabilizing element, or elements, and heats of 18% Cr ferritic stainless steel having zirconium or titanium as the candidate stabilizing element were melted and evaluated. Material from these experimentally stabilized heats was annealed for 1 hour at 1200° C., water quenched, and with but a few minor exceptions aged in accordance with Table III, below.

TABLE III

Aging Temperatures and Times for Experimentally Stabilized Stainless Steels

| Aging Temperature °C. | Aging Time (Hours) | | | | | | | | | |
|---|---|---|---|---|---|---|---|---|---|---|
| | ¼ | ½ | 1 | 2 | 4 | 8 | 16 | 32 | 48 | 96 |
| 600 | X | X | X | | | | | | | |
| 550 | X | X | X | X | X | | | | | |
| 480 | X | X | X | X | X | X | | | | |
| 415 | | | | | | X | X | X | X | X |

Samples of the experimental 12%Cr stainless steels with tantalum and tantalum plus aluminum as the stabilizing element, or elements, exhibited sensitization that was at least as severe as that exhibited by heats A, B, AA, and BB when treated in the same manner, i.e., aged for the times and at the temperatures noted in Table III following a water quench after a 1 hour anneal at 1200° C.

On the other hand, the 12% Cr zirconium stabilized experimental ferritic stainless steels with a sufficiently high zirconium-to-carbon ratio, or ratio of zirconium to the sum of carbon plus nitrogen, surprisingly exhibited neither susceptibility to sensitization nor embrittlement when aged in accordance with the times and temperatures of Table III following a water quench after a 1 hour anneal at 1200° C. The compositions of these 12%Cr zirconium stabilized ferritic stainless steels, designated as heats PP through NN, are listed in Table IV, below.

Also listed in Table IV are 18%Cr zirconium stabilized heats JJ and KK. Heats JJ and KK did not sensitize when aged in accordance with the times and temperatures of Table III following a water quench after a 1 hour anneal at 1200° C. Listed in Table II as heats CC through II are the 18%Cr titanium stabilized heats referred to above. Only two of these heats (CC and DD) did not exhibit sensitization after aging in accordance with the times and temperatures of Table III following a water quench after a 1 hour anneal at 1200° C.

Autogenous bead-on-plate welds were made on samples from heats PP, RR and TT using the tungsten inert gas (TIG) welding process. The samples were annealed for 1 hour at 800° C. and water quenched prior to welding. The welding conditions were 40 amperes, 12 volts, and 4 in/min torch travel speed with 15 CFH argon flowing through the torch.

TABLE IV

| | Compositions[1] of Zirconium Stabilized Ferritic Stainless Steels (wt. %) | | | | | | | | | | | | Sensitization |
|---|---|---|---|---|---|---|---|---|---|---|---|---|---|
| HEAT | C | Si | Mn | P | S | Cr | Mo | Zr | N | Bal[2] | Zr/C | Zr/N | Zr/(C + N) | Resistance Evaluation |
| JJ(624) | 0.015 | 1.0 | 1.0 | 0.004 | 0.003 | 17.65 | — | 0.90 | 0.009 | Fe | 60.0 | 112.5 | 39.1 | PASS |
| KK(625) | 0.011 | 1.0 | 1.0 | 0.004 | 0.003 | 17.58 | — | 0.93 | 0.009 | Fe | 84.6 | 103.3 | 46.5 | PASS |
| LL(BPV10) | 0.021 | 1.0 | 1.0 | 0.004 | 0.003 | 12.80 | — | 0.02 | 0.019 | Fe | 1.0 | 1.1 | 0.50 | FAIL |

TABLE IV-continued

Compositions[1] of Zirconium Stabilized Ferritic Stainless Steels (wt. %)

| HEAT | C | Si | Mn | P | S | Cr | Mo | Zr | N | Bal[2] | Zr/C | Zr/N | Zr/(C + N) | Sensitization Resistance Evaluation |
|---|---|---|---|---|---|---|---|---|---|---|---|---|---|---|
| MM(786) | 0.022 | | | | | 12.79 | — | 0.35 | 0.011 | | 15.9 | 31.8 | 10.6 | PASS |
| NN(799) | 0.019 | | | | | 12.60 | — | 0.32 | 0.018 | | 16.8 | 17.8 | 8.7 | FAIL |
| OO(780) | 0.021 | | | | | 11.86 | — | 0.48 | 0.010 | | 22.9 | 48.0 | 15.5 | PASS |
| PP(593) | 0.034 | | | | | 12.00 | — | 0.94 | 0.007 | | 27.7 | 134.0 | 22.9 | PASS |
| QQ(649) | 0.031 | | | | | 11.94 | — | 1.02 | 0.006 | | 32.9 | 170.0 | 27.6 | PASS |
| RR(608) | 0.021 | | | | | 11.96 | — | 0.90 | 0.009 | | 42.9 | 100.0 | 30.0 | PASS |
| SS(623) | 0.011 | | | | | 11.91 | — | 0.65 | 0.011 | | 59.1 | 59.1 | 29.6 | FAIL |
| TT(594) | 0.025 | | | | | 11.92 | — | 1.84 | 0.006 | | 73.6 | 306.7 | 59.4 | PASS |
| UU(746) | 0.002 | | | | | 12.04 | — | 0.75 | 0.024 | | 375.0 | 31.3 | 28.9 | PASS |

[1]By analysis, except: Si, Mn, P and S max. per specification for heats JJ-NN and Cr target per specification for heat PP.
[2]Plus incidental impurities.

The underbead area was shielded with 15-20 CFH flowing argon.

As-welded and welded specimens aged at 600° C. for ¼, ½, and 1 hour; at 550° C. for ¼, ½, 1, 2, and 4 hours; at 480° C. for 1, 2, 4, and 8 hours; and at 415° C. for 96 hours were tested for sensitization by the ASTM A262E type tests described above. The heat-affected zones, fusion zones, and base metal portions of all specimens from the three heats passed the pass/fail sensitization evaluation criterion described in detail above.

For the zirconium stabilized 12%Cr stainless steels of Table VI (heats PP through NN), resistance to sensitization may be obtained if the zirconium content meets the larger of that specified by the following two criteria:

$$Zr/C \geq 20 \tag{1}$$

$$Zr/(C+N) \geq 15 \tag{2}$$

In the above-referenced Ser. No. 244,379 application, there are disclosed and claimed novel corrosion resistant titanium stabilized ferritic stainless steels one of which is a 12%Cr version requiring, inter alia, a titanium-to-carbon ratio greater than or equal to 50 to impart effective sensitization resistance under conditions of long term exposure at moderate service temperatures. Thus it may be observed by comparing the above zirconium-to-carbon and titanium-to-carbon ratios that zirconium is a more potent stabilizer than titanium by a factor of about 2.5. More importantly, on an atom-for-atom basis zirconium is also at least about 5 times more effective than titanium. Since effective stabilization is obtained with a fewer number of zirconium atoms than titanium atoms, for the same carbon content, zirconium stabilized ferritic stainless steels should be less susceptible to embrittlement than titanium-stabilized stainless steels. The greater effectiveness of zirconium as a stabilizer compared to titanium suggests the use of zirconium in ferritic stainless steels having chromium contents up to about 30%. Zirconium levels significantly in excess of those specified in accordance with the teachings of this invention are to be discouraged, however, both on economic grounds and on technical grounds, i.e., an anticipated tendency for excessive amounts of zirconium to impart brittleness in ferritic stainless steels by analogy to the behavior of titanium.

Accordingly, there are provided by this invention new zirconium stabilized sensitization resistant ferritic stainless steels. The wide chromium range version consists essentially of, in weight percent, 0.025% max carbon, 0.025% max nitrogen, 1.0% max silicon, 1.0% max manganese, 0.04% max phosphorous, 0.03% max sulfur, 11 to 30% chromium, and 0.015 to 2.0% zirconium; the sum of carbon plus nitrogen is 0.045% max, and the balance is iron plus impurities.

If the range for percentage chromium in the above-described alloy is decreased to 11 to 13%, the range for weight percentage zirconium remains the same as above (0.015 to 2.0%), but may be particularly specified in terms of whichever of the following two criteria $$Zr/C \geq 20 \tag{1}$$

$$Zr/(C+N) \geq 15 \tag{2}$$

yields the larger value for weight percentage zirconium.

If the range for percentage chromium in the above-described wide chromium range version is restricted to 17 to 20%, then the range for weight percentage zirconium will also be the same as above (0.015 to 2.0%), but may be particularly specified such that the zirconium-to-carbon plus nitrogen ratio is equal to or greater than about 16. This latter aspect of the invention follows from the observation, based on heats CC through II of Table II, that a titanium-to-carbon plus nitrogen ratio of at least about 40 is required for sensitization resistance and the discovery, discussed above, that zirconium is about 2.5 times more effective than titanium in imparting sensitization resistance in these novel ferritic stainless steels.

An 18% chromium-2% molybdenum version consists essentially of, in weight percent, 0.025% max carbon, 0.025% max nitrogen, 1.0% max silicon, 1.0% max manganese, 0.04% max phosphorous, 0.03% max sulfur, 18 to 20% chromium, 1.75 to 2.25% molybdenum, and zirconium in percentage selected such that the zirconium-to-carbon ratio is equal to or greater than about 18; the sum of carbon plus nitrogen is 0.045% max, and the balance is iron plus impurities. This 18%Cr-2%Mo version follows from the Ser. No. 244,379 application wherein a novel 18%Cr-2%Mo titanium stabilized stainless steel is disclosed and claimed in which the titanium-to-carbon ratio is greater than or equal to about 45 combined with the discovery, discussed above, that zirconium is about 2.5 times more effective than titanium in imparting sensitization resistance in these novel ferritic stainless steels.

The unspecified impurities which may be present in these novel alloys may be introduced in or accompany the process of alloy manufacture in accordance with common steel-making processes and do not materially affect the basic and novel characteristics of the claimed alloys. Such incidental impurities may include, as a maximum, 0.60% Ni, 0.40% Al, 0.30% Cu, and/or 0.30% Co.

Figure 7:
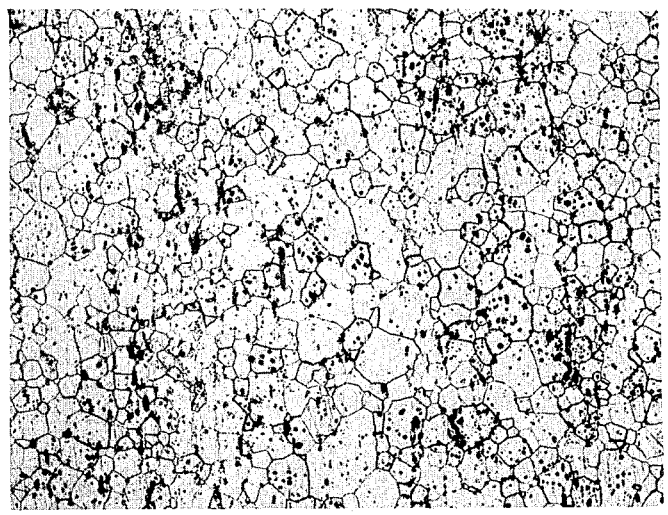
FIG. 7 is a photomicrograph at 250× of zirconium stabilized 12% Cr heat TT following a 1 hour anneal at 1200° C., water quenching, and aging at 480° C. for 4 hours.
Figure 8:
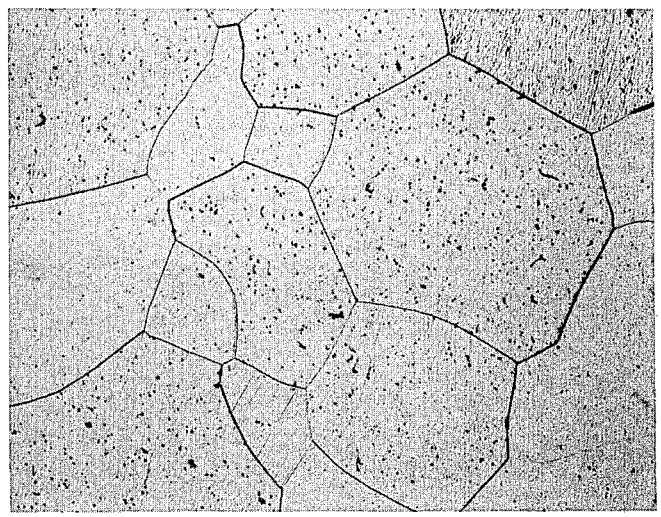
FIG. 8 is a photomicrograph at 250× of titanium-stabilized 18% Cr-2% Mo heat AA following a 1 hour anneal at 1200° C., water quenching and aging at 480° C. for 4 hours.

An unexpected attribute of the zirconium stabilized stainless steels of this invention is the fine grain size exhibited from heat-to-heat. An example of the fine grain size of these new ferritic stainless steels is shown in FIG. 7 which is a photomicrograph of heat TT at 250X following a 1 hour anneal at 1200° C., water quenching, and aging for 4 hours at 480° C. FIG. 7 is representative of all heats of the novel 18%Cr an 12%Cr zirconium stabilized stainless steels made in the course of this innvention. Comparison with conventional titanium-stabilized ferritic stainless steels may be made by reference to FIG. 8 which is a photomicrograph of heat AA at 250X following a 1 hour anneal at 1200° C., water quenching, and aging for 4 hours at 480° C. FIG. 8 is generally representative, i.e., about 75 percent, of the grain size observed in the prior art titanium-stabilized ferritic stainless steels investigated during the course of the making of this invention following a water quench after a 1 hour anneal at 1200° C. In the remaining approximately 25 percent, the grain size varied from that of FIG. 8 to that of FIG. 7 in a random fashion. The as-quenched grain size of the heats of stainless steels listed in Tables II and IV was generally unaffected by the aging times and temperatures investigated during the course of the making of this invention.

The ferritic stainless steel of the present invention are generally suitable for long-term use at moderate service temperatures in the as-welded condition or following a high temperature anneal (i.e., greater than about 800° C.). These new stainless steels are particularly suitable for use in the as-welded condition as tubing in heat exchangers such as moisture separator reheaters and feedwater preheaters frequently found in the steam supply systems of fossil-fired and nuclear fueled commercial electrical power generating stations. Other applications, particularly those requiring resistance to sensitization in service environments encompassing intermediate temperatures for long periods of time, may be made within the ordinary skill of the art without departing from the spirit and scope of the invention, said invention being limited only by the scope of the appended claims.

I claim:

1. In the method for making an apparatus for the exchange of heat in which a plurality of thin walled tubular metal members are formed, finned and welded to tube sheets in an array with gaps between said members, the improvement of using as the metal for the walls of said members a zirconium stabilized corrosion resistant ferritic stainless steel consisting essentially of, in weight percent:
   Carbon = 0.025% max
   Nitrogen = 0.025% max
   Carbon + Nitrogen = 0.045% max
   Silicon = 1.0% max
   Manganese = 1.0% max
   Phosphorous = 0.04% max
   Sulfur = 0.03% max
   Chromium = 18–20%
   Molybdenum = 1.75–2.25%
   (Zirconium/Carbon) $\geq$ 18
the balance being iron and incidental impurities.

2. In the method for making moisture separator reheater and feedwater preheater apparatus for the exchange of heat in which a plurality of thin-walled tubular metal members are formed, finned and welded to tube sheets in an array with gaps between said members, the improvement of using as the metal for the walls of said members a zirconium stabilized and corrosion resistant ferritic stainless steel resistant to sensitization during long-term operation at intermediate temperatures in said apparatus for the exchange of heat and consisting essentially of, in weight percent:
   Carbon = 0.025% max
   Nitrogen = 0.025% max
   Carbon + Nitrogen = 0.045% max
   Silicon = 1.0% max
   Manganese = 1.0% max
   Phosphorous = 0.04% max
   Sulfur = 0.03% max
   Chromium = 17–20%
   [Zirconium/(Carbon + Nitrogen)] $\geq$ 16
the balance being iron and incidental impurities.

3. In the method for making moisture separator reheater and feedwater preheater apparatus for the exchange of heat in which a plurality of thin-walled tubular metal members are formed, finned and welded to tube sheets in an array with gaps between said members, the improvement of using as the metal for the walls of said members a zirconium stabilized corrosion resistant ferritic stainless steel consisting essentially of, in weight percent:

| | | |
|---|---|---|
| Carbon | = | 0.025% max |
| Nitrogen | = | 0.025% max |
| Carbon + Nitrogen | = | 0.045% max |
| Silicon | = | 1.0% max |
| Manganese | = | 1.0% max |
| Phosphorous | = | 0.04% max |
| Sulfur | = | 0.03% max |
| Chromium | = | 11–13% |
| Zirconium | = | the larger percentage of zirconium satisfying the criteria: (1) Zr/C $\geq$ 20 or (2) Zr/(C + N) $\geq$ 15 | the balance being iron and incidental impurities, said thin-walled members being resistant to sensitization during long-term operation at intermediate temperatures.

* * * * *